United States Patent

[11] 3,552,624

| [72] | Inventors | Edgar G. M. Dykeman, Riverside, Calif.; Kathaleen M. Dykeman, Riverside, Calif. administratrix to said Edgar G. M. Dykeman, deceased |
|---|---|---|
| [21] | Appl. No. | 724,683 |
| [22] | Filed | Apr. 24, 1968 |
| [45] | Patented | Jan. 5, 1971 |
| [73] | Assignee | FMC Corporation, San Jose, Calif., a corporation of Delaware |

[54] ASSEMBLY JIG FOR THE NAILING OF WOOD FRAME MEMBERS
13 Claims, 12 Drawing Figs.

| [52] | U.S. Cl. | 227/3, 227/100 |
|---|---|---|
| [51] | Int. Cl. | B27f 7/06 |
| [50] | Field of Search | 227/3, 4, 40, 99, 100, 101, 103; 144/288, 288—6 |

[56] References Cited
UNITED STATES PATENTS

| 690,416 | 1/1902 | Fuller | 144/288UX |
|---|---|---|---|
| 2,197,371 | 4/1940 | Thedford et al. | 227/3 |
| 2,856,606 | 10/1958 | Richards | 227/109 |
| 3,381,870 | 5/1968 | Haskins | 227/3 |

*Primary Examiner*—Granville Y. Custer, Jr.
*Attorneys*—Francis W. Anderson and C. E. Tripp

ABSTRACT: A jig for assembling the stringers and deck boards of a pallet and carrying them beneath a nailing machine structure where they can be nailed together. The jig contains a pair of laterally adjustable, pivotally mounted support members for supporting the opposite longitudinal ends of the underlying stringers, the support members being arranged to be cammed outwardly when they have cleared the nailing machine structure to cause the partially constructed pallet to drop from the jig.

FIG_10

3,552,624

ASSEMBLY JIG FOR THE NAILING OF WOOD FRAME MEMBERS

BACKGROUND OF THE INVENTION

1. Field of the Invention

In general, this invention pertains to that field of art concerned with apparatus for positioning wood frame members prior to the nailing thereof, and more particularly, it pertains to assembly jigs for the proper positioning of the wood frame members of a pallet and for the feeding of the same to automatic nailing machinery.

2. Description of the Prior Art

Wooden pallets, which are used to support stacked loads of goods, have become increasingly important to many phases of industry during recent years due to a general move towards automated material handling systems to reduce the time consuming and costly labor involved in hand stacking and transporting operations. Although pallets may come in a variety of specific designs, basically they comprise a series of spaced stringers secured together by deck boards running crosswise to both their top and bottom side edges. In the case of skids, a special type of pallet, only one edge of the stringers or runners, is secured by the transversely extending deck boards. Due to the heavy demand for such pallet structures, pallet manufacturers have long been seeking methods and means to efficiently increase their production rates without the addition of offsetting increased labor costs.

Since pallets are very simple structures and are subject to simple nailing techniques, a first step away from hand nailing operations was the introduction of automatic nailing machines wherein preassembled wooden pieces could be pushed or pulled through the machine and automatically nailed at the required spacings. In order to maintain the stringers and deck boards of a pallet in the proper engaged position for such nailing, special jigs were constructed for receiving and holding the individual wood pieces, and such jigs could then easily be pushed through the nailing machine by a single operator. The nailing machines and jigs in the more sophisticated plants, were provided with various interengaging stops so that the jig would automatically position itself for proper nailing. For example, the patent to Cable 2,639,427 discloses a nailing jig for pallets generally as described, and illustrates its use with a common industrial type nailing machine.

A disadvantage of the simple one-piece type of jig such as is disclosed in the aforementioned patent to Cable, is that it lacks versatility. Generally, such a jig can only be used to nail one specific type and size of pallet, and a new jig is therefore needed for each different pallet manufactured. Furthermore, considerable hand labor is still needed to load and unload the jigs and to control their movement through the nailing machine.

In more recent years, adjustable jigs have been proposed for handling different widths and lengths of pallets. The patent to Deamer et al. 2,958,351 discloses such a jig, for example. In addition to the adjustable feature, jigs have also been incorporated with conveying apparatus so that they can be automatically carried through the nailing machine. An example of an adjustable and automatically movable jig or fixture for pallets is shown in the prior patent to Stoddard et al. 3,207,403.

Although adjustable jigs are available, these jigs generally suffer from the disadvantages that they are limited to a minor range of adjustment and/or that they are expensive and complex and thereby add greatly to the cost of pallet manufacture. Another general problem with the prior art jigs is the relative difficulty of and the time required to remove the nailed pallet from the jig and to reload the jig with the wooden pallet members for a subsequent nailing operation.

SUMMARY OF THE INVENTION

The present invention comprises a jig for the assembly of wooden frame members which is readily adjustable to handle structures of different widths and lengths. The jig is provided with automatic conveying means and is designed to be used in conjunction with any of the more common industrial nailing machines wherein the workpiece is carried through the machine in a horizontal position with the nail driving heads operating vertically thereabove. An important feature of the present invention is the provision of control apparatus that will automatically correctly position the assembled boards beneath the nailing heads so that they can be nailed together. Another important feature of the present invention is the special jig construction which permits the automatic discharge of the wooden assembly upon completion of the nailing operation, the jig then automatically returning to the loading station ready for a subsequent operation.

Although the jig of the present invention has been specifically designed to assemble the stringers and deck boards of wooden pallets, it will be readily apparent that other simple wooden structures of a generally similar nature can also be constructed using the concepts and methods disclosed herein.

Basically, the jig of the present invention comprises a carriage which is movable along a track beneath the nailing heads. The carriage is provided with a pair of laterally adjustable stringer supporting members and a longitudinally adjustable deck board stop. The stringers are positioned transversely in the jig between the stringer supporting members with the deck boards being laid crosswise to and on top thereof. After the carriage has passed through the nailing machine and the deck boards and stringers have been nailed together, the stringer supporting members are arranged to be shifted outwardly to drop the partially constructed pallet to an underlying takeaway conveyor. The jig is then returned to the loading station and the operation is repeated.

Since both the nailing and the discharge of the pallets are accomplished automatically, the only hand operation involved in this phase of the pallet construction is in the initial loading of the jig. Due to the simplified and unique construction of the jig, this particular operation can be handled quickly and easily.

DESCRIPTION OF THE PREFERRED EMBODIMENT

Figure 1:
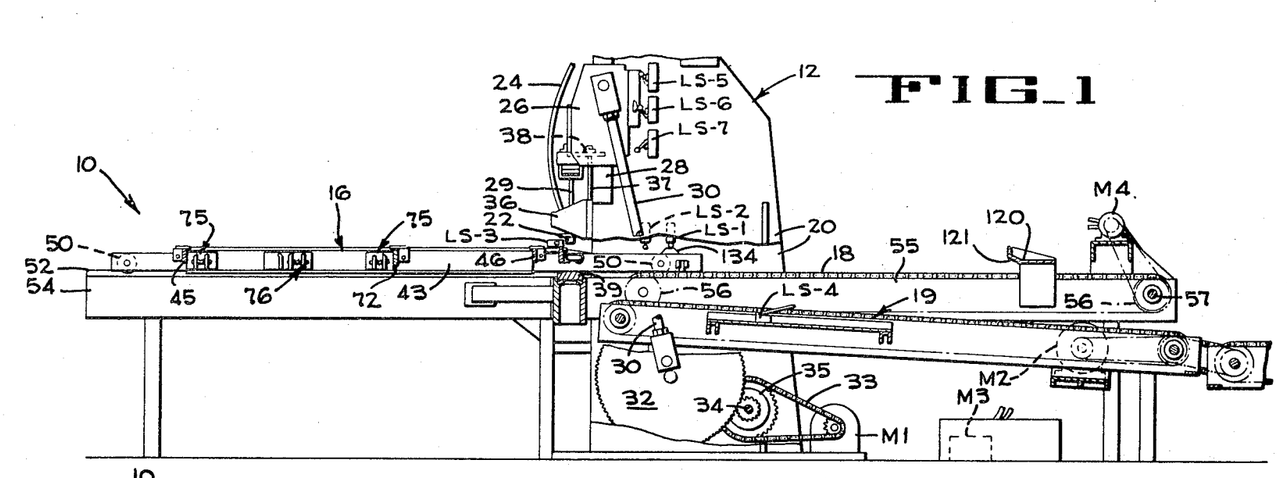
FIG. 1 is a central section through the assembly jig and conveying apparatus of the present invention illustrating their use in conjunction with an industrial type nailing machine.
Figure 2:
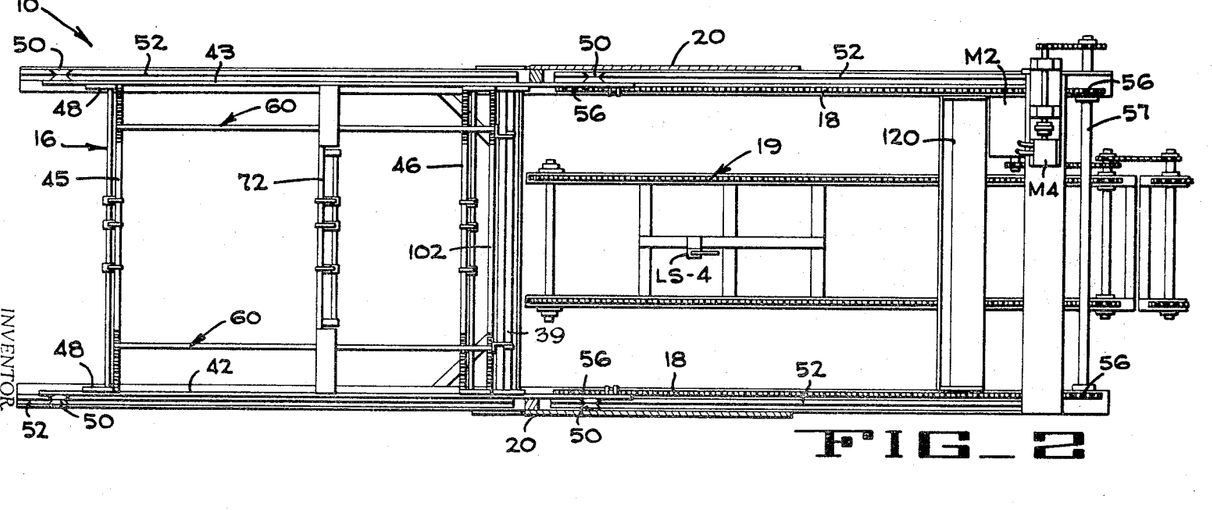
FIG. 2 is a plan of the apparatus shown in FIG. 1, the details of the nailing machine being eliminated with only a portion of the side frame and the anvil thereof being shown.

Referring first to FIG. 1 of the drawings, the assembly jig 10 of the present invention is there shown as it may be used in conjunction with nailing machine 12. The jig comprises a carriage 16 (shown at the loading station at the left side of FIG. 1) for supporting the wooden members to be nailed together and the transport means therefor include a pair of endless chain conveyors 18 attached to the leading end of the carriage. The conveyor chains are arranged to be driven by a hydraulic motor M4 in both the forward and the reverse directions to pull the carriage beneath the nailing machine structure and to push it back to the loading station. Control means are provided so that the carriage will be stopped at the appropriate positions beneath the nailing machine to allow nails to be driven through the overlapped boards assembled in the carriage. When the carriage has cleared the nailing machine, means are provided to discharge the nailed structure by dropping it onto an underlying take-away conveyor 19; the drive motor M4 is then reversed to push the carriage back to the loading position.

The nailing machine 12 may be any conventional industrial nailer wherein the workpiece to be nailed is conveyed horizontally through the machine and wherein plural nailing heads operate vertically over the workpiece, such as is shown in the patent to Richards 2,856,606, for example. The nailing machine shown in FIG. 1 generally comprises a pair of rigid side frame members 20 which straddle the jig 10 and mount for vertical movement a plurality of nail holding chucks 22, each chuck being individually fed nails through tubes 24. The chucks are adjustably positioned laterally across the machine (one only being shown in FIG. 1) so that an entire transversely extending line of nails can be driven at the same time. The nails are forced out of the chucks and through the wood members on the jig by a vertically reciprocating, nail driving head 26 which is slidably mounted upon track members 28 on the side frame members 20 (one track only being shown in FIG. 1). The nailing head carries a plurality of rodlike nail punches 29 which are each associated with a nail chuck and which reciprocate through the chuck to drive the nail therefrom. The nailing head is reciprocated vertically by means of a pivotally mounted drive arm 30 which is eccentrically mounted upon a large drive wheel 32 at the base of the machine. When it is desired to operate the nailing head the drive wheel is rotated through one revolution by means of a continuously operating drive motor M1 and a drive chain 33 which powers a drive shaft 34 through a selectively energizable clutch mechanism 35. Each of the nail-carrying chucks is supported upon a connecting bar 36 extending transversely across the machine, the connecting bar being also slidably supported upon the nailing machine frame members 20 in the manner of the nailing head 26. The chuck connecting bar is supported from the nailing head by means of a pair of rods 37 at each side of the machine, the upper ends of which are slidably supported within the nailing head and include stop members 38. When the nailing head moves downwardly the chucks will be carried with it until they strike the top of the structure to be nailed. The nailing head then continues its downward travel carrying the nail punches 29 through the chucks to drive the nails. The distance which the chucks will travel is just enough to allow ample clearance for the members in the jig, and in practicing the invention, it is set at about ¾ inches. When the wood members in the jig are nailed, they are lifted slightly from the jig (in a manner to be explained further hereinafter) and supported upon an anvil 39 located beneath the nail chucks and extending transversely between the side frame members 20 of the machine. For a further description of the structure and operation of the nailing machine 12, reference is made to the hereinbefore mentioned patent to Richards 2,856,606.

Figure 3:
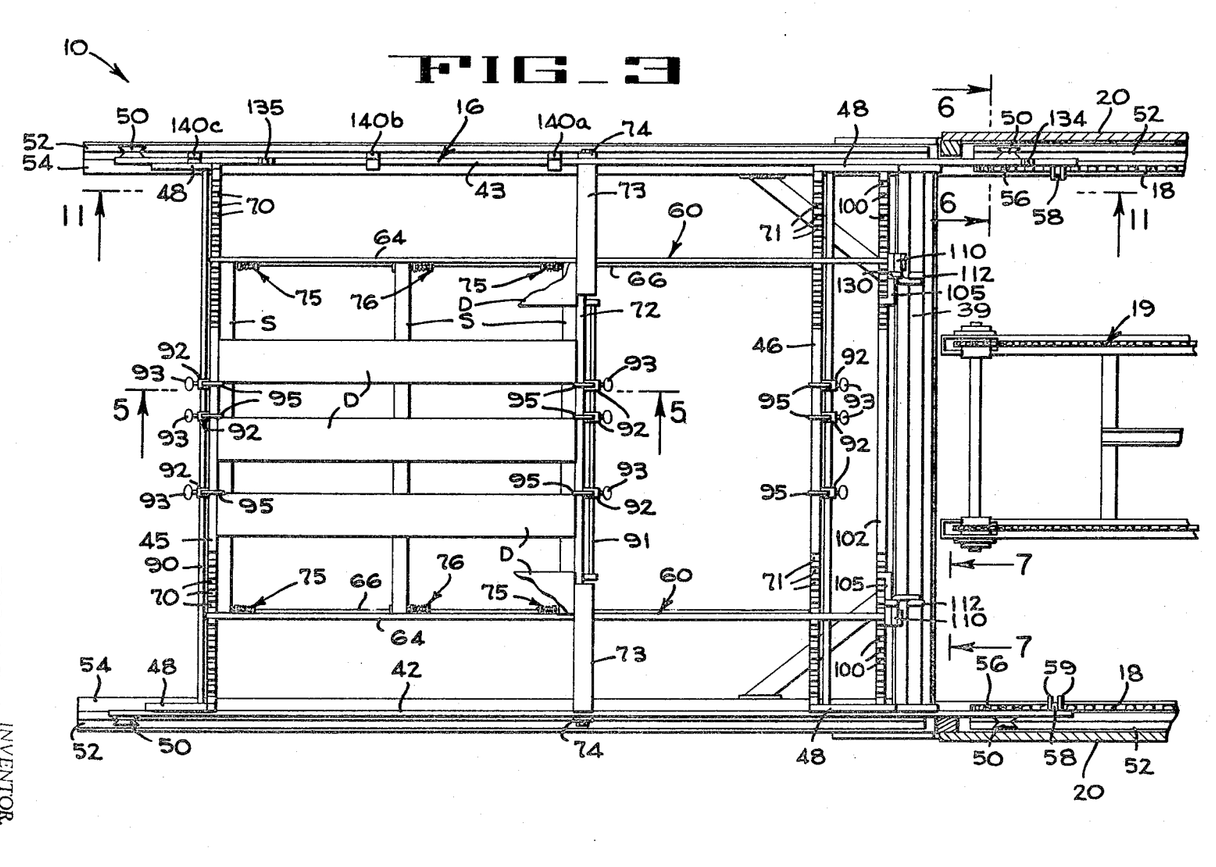
FIG. 3 is an enlarged plan of the jig and supporting assembly as shown in FIG. 2 but illustrating the jig in its loaded condition.
Figure 4:
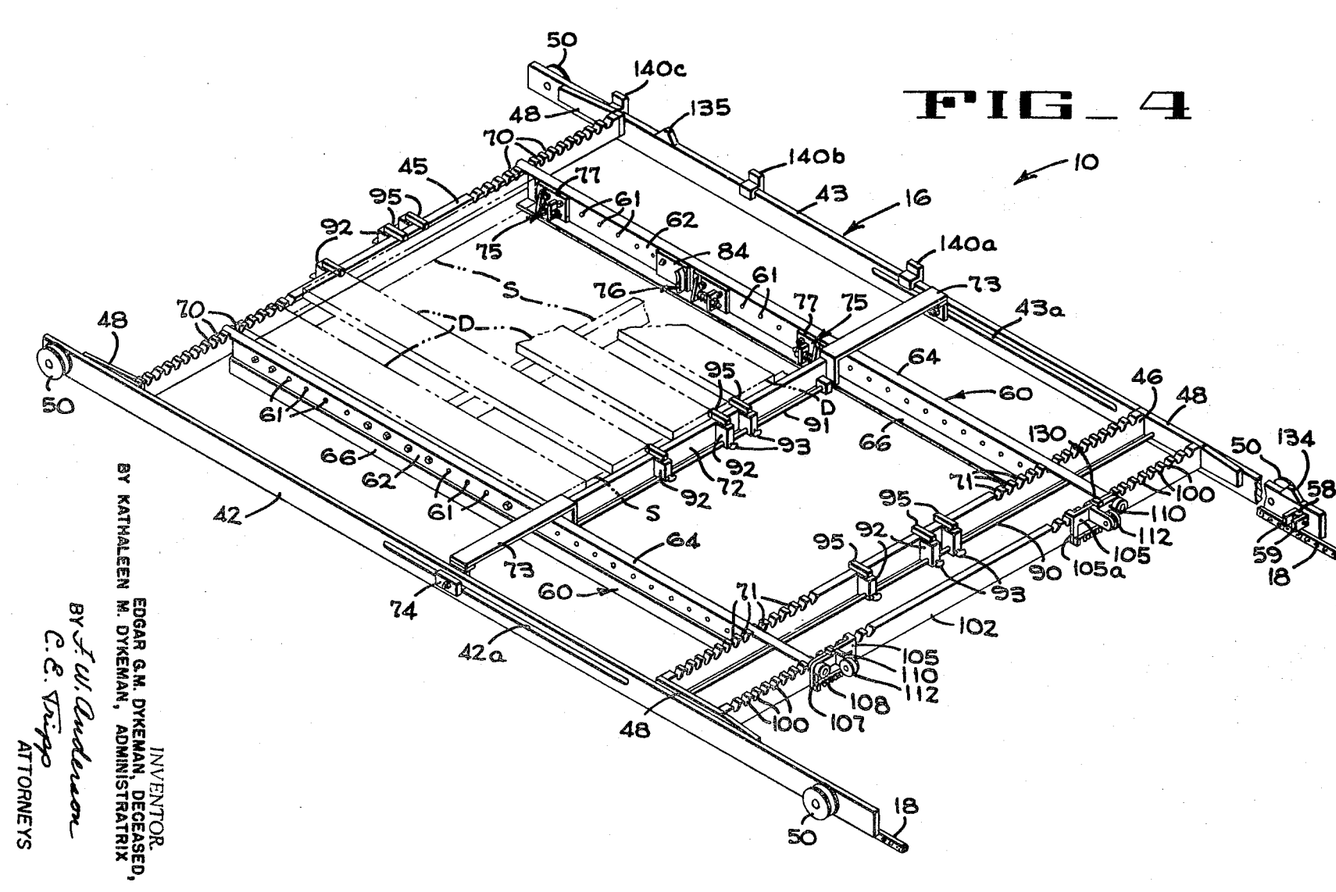
FIG. 4 is an isometric of the jig shown in FIG. 3 with the assembled members of the pallet to be nailed together being fragmentarily shown in phantom lines.
Figures 5, 6, 7, 8, 9:
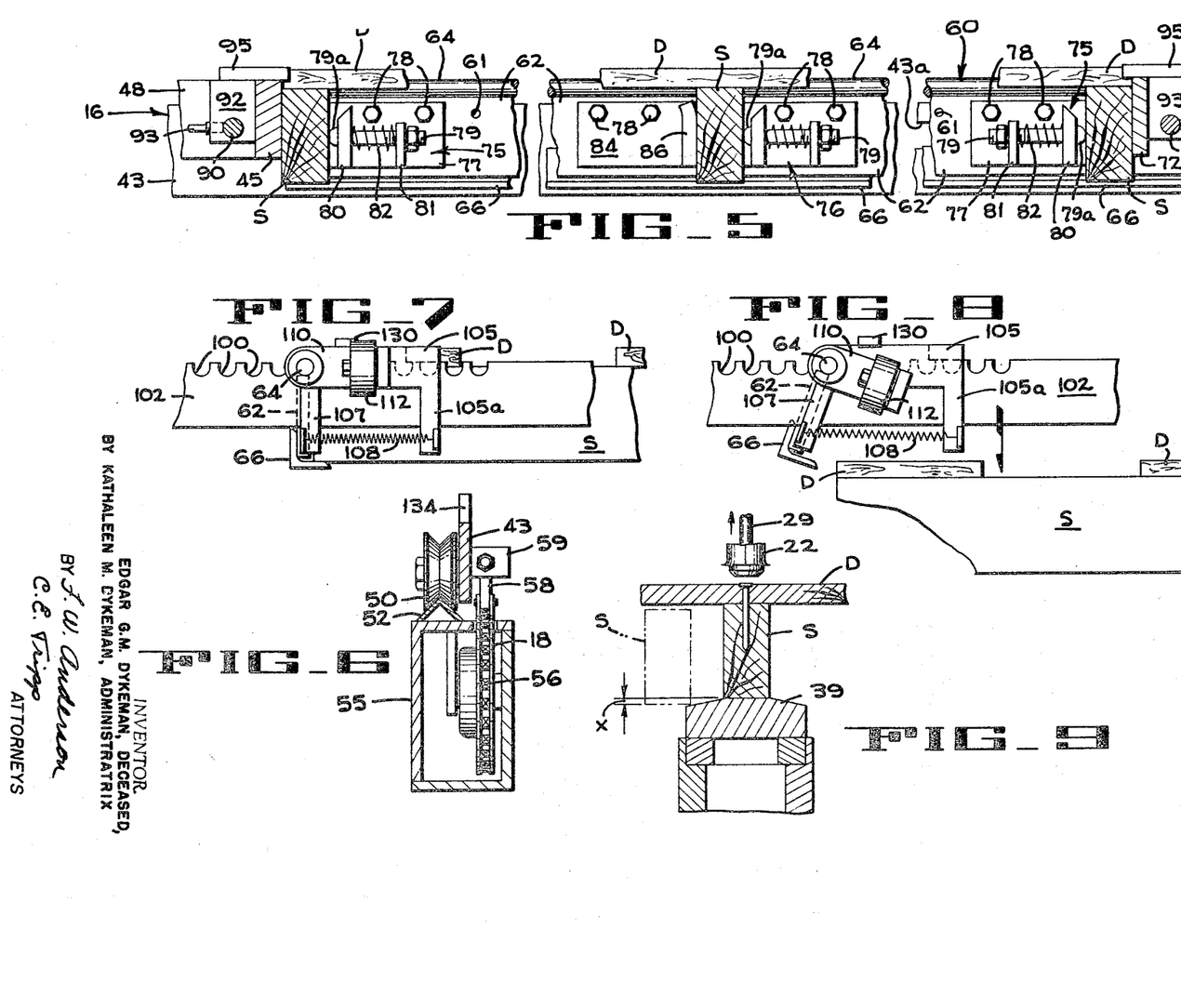
FIG. 5 is an enlarged fragmented section taken along the line 5–5 of FIG. 3 and particularly illustrating one of the stringer supporting assemblies.
FIG. 6 is an enlarged section taken along the line 6–6 of FIG. 3 and particularly illustrating the connection between the conveyor and the jig.
FIG. 7 is an enlarged end elevation of one of the stringer supporting assemblies taken generally in the plane of line 7–7 of FIG. 3.
FIG. 8 is an end elevation similar to FIG. 7 but illustrating the stringer supporting assembly in its outwardly pivoted position wherein the nailed pallet structure is permitted to drop.
FIG. 9 is an enlarged fragmentary section through the nailing machine anvil as shown in FIG. 1 but illustrating the position of the pallet members thereon when they are nailed together.
Figure 12:
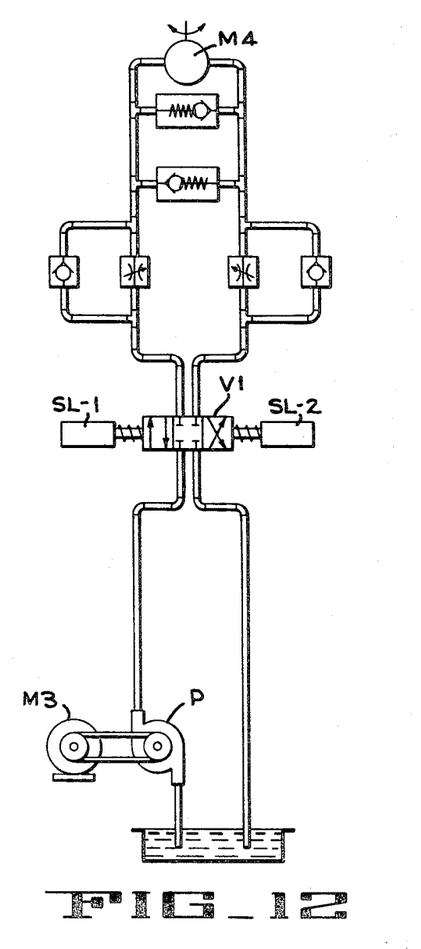
FIG. 12 is a schematic illustration of the hydraulic circuitry for the conveyor drive motor.

The assembly carriage 16, which is best shown in FIGS. 3 and 4, is seen to comprise a rigid rectangular frame structure which includes a pair of side frame members 42 and 43, a rear cross frame member 45, and a front cross frame member 46, each of the cross frame members being rigidly attached to flat mounting plates 48 which are, in turn, welded or otherwise secured to the side frame members. Rollers 50 with V-shaped grooves therein are attached to both the trailing and leading ends of the side frame members on the outside faces thereof to support the carriage for rolling movement along a pair of inverted V-shaped tracks 52 which extend throughout the length of the apparatus. The tracks are supported at the loading side of the apparatus upon a pair of frame members 54 (FIG. 1) which extend to the anvil 39 of the nailing machine. On the discharge side of the apparatus the tracks are supported by box-shaped frame members 55 (FIG. 6) which extend from the anvil to a position spaced far enough from the nailing machine to permit discharge of the pallet from the carriage. Each of the box-shaped frame members 55 (FIG. 6) serves to mount a pair of sprockets 56 which are arranged to receive the endless conveyor chains 18. The chains are powered by means of a drive chain connection (FIG. 1) between the reversible hydraulic motor M4 and a drive shaft 57 carrying the sprockets 56 at the discharge end of the apparatus. The carriage is connected to the drive chains by means of chain link extensions 58 which are bolted between a pair of brackets 59 attached to the leading end of the side frame members 42 and 43 (FIGS. 4 and 6). The hydraulic motor M4 is designed to operate through hydraulic circuitry (FIG. 12) and a drive pump P which is driven by an electric motor M3, all located at the base of the apparatus.

While the assembly carriage 16 of the present invention may readily be adapted to hold various wooden frame structures, it will be described in the present application as it is utilized to handle the assembly of and the nailing of wooden pallets. Referring now to FIGS. 3 and 4, a pallet structure is seen to be comprised of three underlying stringers S and a plurality of overlying deck boards D. These members are nailed together when each of the transversely extending stringers arrives at a position directly under the nail chucks 22 and above the anvil 39 of the nailing machine. The completely constructed pallet would normally also include a second set of deck boards D extending across the lower side surfaces of the stringers, and these would have to be nailed to the stringers in a subsequent nailing operation. The takeaway conveyor 19, which carries the partially constructed pallet out of the apparatus, may be arranged to convey the pallet to an area where the placement of the second set of deck boards and the nailing thereof can be accomplished. In the case of skids, wherein the deck boards are provided only on one side of a spaced set of stringers or runners, the jig of the present invention will permit the complete nailing operation.

The stringers S of the pallet are supported in the carriage 16 by a pair of adjustable stringer support assemblies 60 (FIG. 4) which include backing plates 62 having a plurality of uniformly spaced bolt holes 61 extending along the length thereof. A cylindrical support rod 64 is attached to the upper end of each backing plate and an angle iron 66 is rigidly attached to the lower edge of the backing plate for supporting the lowermost end surfaces of the stringers. The stringer supporting assemblies are adjustably mounted upon the carriage by means of the support rods which are arranged to be received within an aligned pair of a series of U-shaped grooves 70 and 71 extending along the top surfaces of the rear cross frame member 45 and front cross frame member 46, respectively. It can readily be seen that the stringer supporting assemblies can be moved either inwardly from or outwardly towards the fixed side frame members 42 and 43 by merely lifting the support rods from their positions on the cross frame members and placing them in a different set of U-shaped grooves. Thus, the jig can readily be adapted to handle stringers (or wooden cross frame members in general) of any desired length within the dimensions of the fixed cross frame members 45 and 46. The length of the pallet, as determined by the length of the deck boards D, is set by means of a flat-faced back bar 72 which is adjustably positioned between the stringer supporting assemblies. Each end of the back bar is rigidly attached to one of the downwardly extending legs of a channel-shaped supporting bracket 73 with the other leg of each bracket being bolted to a slide block 74 which extends through and is slidably mounted in slots 42a and 43a extending along the side frame members 42 and 43, respectively. By loosening the bolts in the slide blocks, the back bar can readily be slid to different positions along the carriage to set the distance between the outside stringers of the pallet. If desired, the maximum sized pallets can be constructed by removing the back bar and its supporting structure entirely and placing the outside stringers against the cross frame members 45 and 46.

The stringers S are held between the stringer supporting assemblies 60 by means of spring-plunger assemblies 75 (FIG. 5) located adjacent to the rear cross frame member 45 and the back bar 72 and by a spring-plunger assembly 76 (FIG. 5) located midway between the assemblies 75 to support the middle stringer. Each of the outer spring-plunger assemblies 75 comprises a mounting plate 77 which is secured by bolts 78 to the backing plate 62 through two of the bolt holes 61 therein. A plunger 79 having an enlarged head 79a is slidably positioned between a pair of brackets 80 and 81 attached to the mounting plate and is urged by a compression spring 82 in a direction towards the pocket formed by the adjacent rear cross frame member 45 or backing bar 72. The centrally located assembly 76 includes a somewhat larger mounting plate 84 which is also secured to the backing plate 62 of the stringer supporting assembly by means of a plurality of bolts 78 suitably secured through appropriately located holes in the backing plate. This spring-plunger assembly includes a plunger 79 and encircling spring 82 positioned between brackets 80 and 81 similar to the arrangement on the assemblies 75 and also includes a flat-faced plate 86 extending outwardly from the mounting plate to form a pocket with the plunger to support the side faces of the middle stringer. It can readily be seen that the stringers are easily positioned in the pockets formed by the spring-plunger assemblies when they are forced down over the protruding ends 79a of the plungers until they can be securely received upon the underlying angle iron support members 66. It will also be noted that the uniformly spaced mounting holes 61 in the backing plates 62 allow the spring-plunger assemblies to be shifted in position so that the stringer supporting assemblies can be adapted to handle pallets of different lengths or with different stringer placements. It is obvious that additional spring-plunger assemblies 76 can be provided to handle additional stringers if required.

Extending parallel to the front and rear cross frame members 46 and 45 are a pair of mounting rods 90 which are rigidly attached to the front and rear sets of mounting plates 48. A shorter mounting rod 91 extends parallel to the back bar 72 and is mounted between the inverted channel-shaped brackets 73. These rods each slidably support a plurality of deck board spacing members 92. Each deck board spacing member includes a thumb screw adjustment means 93 (FIG. 5) so that it can be positioned in various locations along the length of its associated rod. The spacing members also include an inwardly projecting guide piece 95 extending over the upper edge of the adjacent cross frame member or back bar. These guide pieces serve as locaters for the deck boards when they are positioned on top of the stringers. It will be appreciated that operators, working at either side of the carriage, may slide the deck boards D along the top of the stringers until they are in engagement with an aligned pair of guide pieces or into engagement with the outside rods 64 (as shown in FIGS. 3 and 4) to thereby load the carriage. The spacer members 92 may be provided in any number and in any location to vary the pattern of the deck boards upon the stringers.

A special feature of the present invention is the means for discharging the nailed pallet structure from the jig after it has completely passed through the nailing machine. In order to provide this function, the leading ends of the rods 64 of the stringer supporting assemblies 60 are rotatably located within U-shaped notches 100 of a crossbar 102 extending between and being rigidly secured to the forward mounting plates 48, the bar 102 being generally similar in construction to the front cross frame member 46 which it parallels. Affixed to the cross bar 102 adjacent to the projecting ends of the rods are a pair of L-shaped brackets 105 (FIG. 7) each having a horizontally positioned leg rotatably attached about the adjacent rod. A support arm 107 is rigidly attached to the end of each of the rods and carries at its outermost end a tension spring 108 which is attached also to a depending arm 105a of the adjacent bracket 105. Also rigidly attached to the projecting ends of the rods are inwardly projecting support arms 110 which are arranged to rotatably support a cam follower roller 112. Extending across and being mounted by the side frame members 55 at the discharge end of the apparatus is a cam member 120 which includes an inclined cam face 121 facing in the direction of the nailing machine. When the carriage has been carried through the nailing machine the cam follower rollers, being at the leading ends of the stringer supporting assembly rods 64, will strike the inclined face of the cam and cause the rods to rotate within their supporting slots 70, 71 and 100 (in a clockwise direction as seen in the operational views of FIGS. 7 and 8). This rotation of the rods causes the angle irons 66 supporting the stringers to be pivoted outwardly to thereby permit the pallet to fall freely from the carriage. The pallet will fall to the take-away conveyor 19 which is continuously driven by a motor M2 to carry the pallet to a subsequent nailing station. When the carriage is reversed in direction and moved back to its loading position, by means to be described presently, the follower rollers will be freed from the cam and they will return to their normal horizontal position, as shown in FIG. 7, under the urging of the tension springs 108. Stop members 130 projecting from the upper edge of the brackets 105 limit the travel of the support arms 110 that carry the rollers so that they will be maintained in the horizontal position during the remainder of the operating cycle.

By means to be described, the carriage 16 will be automatically stopped when the stringers S are received directly beneath the nail chucks 22 of the nailing machine. At this time, it is preferable to lift the stringers slightly out of the jig and onto the anvil 39 of the nailing machine so that the nailing will be done on the anvil rather than on the jig. FIG. 9 shows this arrangement wherein a stringer is cammed upwardly out of the jig a distance "X" by the inclined rearward face of the anvil. It will be understood that the anvil will be provided with removable upper portions (not shown in the drawings) to allow passage of the stringer supporting assemblies 60 during operation of the apparatus. After the stringer is moved out from under the nail chucks, it will slide down the inclined front face of the anvil to be received again upon the underlying angle irons 66 of the stringer supporting assemblies.

Figure 11:
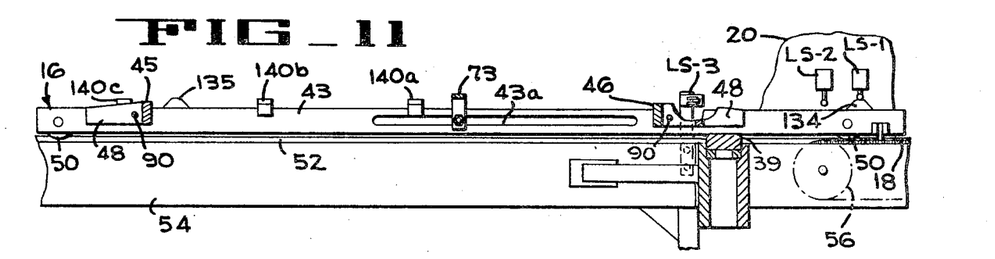
FIG. 11 is a section taken along line 11–11 of FIG. 3 particularly illustrating the positions of the control switches and their actuating members.

In describing the operation of the jig 10 of the present invention, reference is first made to the various switches and switch actuators which permit automatic operation. Limit switches LS-1 and LS-2, best shown in FIG. 11, are positioned on the nailing machine frame and function to stop the jig in the loading and discharging positions, respectively. These switches are arranged in positions to be contacted by actuator blocks 134 and 135 positioned respectively at the leading and trailing ends of the side frame member 43 along the top edge thereof. Side frame member 43 also carries a set of three nailing actuators 140a, 140b and 140c each having an upwardly projecting edge offset outwardly from the actuators 134 and 135 (as best seen in FIG. 4). It will be noted that the nailing actuators 140 correspond in number to the stringers S and are each positioned rearwardly of a corresponding stringer by a distance equal to the horizontal distance between the nailing line at the center of the anvil 39 and the location of a conveyor limit switch LS-3 adapted to be engaged by the actuators to stop the carriage in the proper position for nailing. Another limit switch LS-4 is positioned upon the take-away conveyor 19 in a position to be actuated by the falling pallet to signal the carriage to return to the loading station. A bank of three limit switches LS-5, LS-6 and LS-7 are positioned upon the nailing machine structure in positions to be actuated by a portion of the reciprocable nailing head 26. When the nailing head is in the normal up position (as shown in FIG. 1), switches LS-5 and LS-6 are actuated and the lowermost switch LS-7 is unactuated. When the nailing head moves down to drive a line of nails through the pallet structure, the top switches LS-5 and LS-6 are deactuated, and the lowermost switch LS-7 will be actuated.

Figure 10:
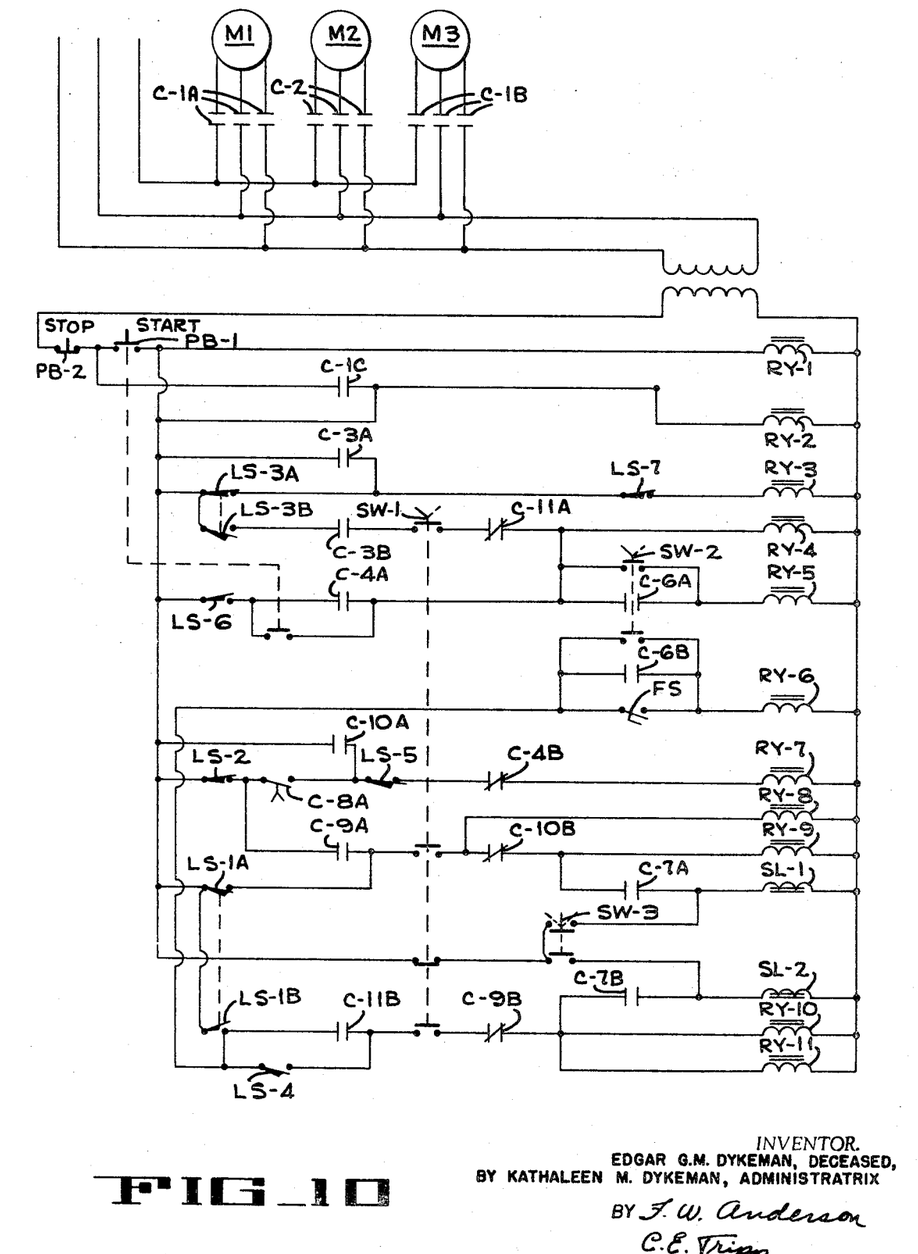
FIG. 10 is a schematic illustration of the electrical circuitry for operating the apparatus of the present invention.

Having physically located the various switches and switch actuating elements, the operation of the apparatus of the present invention will now be described in connection with the schematic circuit illustrated in FIG. 10. The numbers following the contacts "C" relate those contacts to the similarly numbered relays "RY" whose energization determine the positions of the contacts – the contacts being shown in their "normal" or unenergized condition. Initially, the start button PB-1 is pressed to energize relay RY-1 which closes the set of contacts C-1A to the motor M1 and the set of contacts C-1B to the motor M3. Relay RY-1 also closes contact C-1C to energize relay RY-2 and close the set of motor contacts C-2 to the motor M2. Thus, the take-away conveyor is put into motion and the hydraulic circuitry for driving the conveyor motor M4 is ready to function as is the nailing machine. Next, toggle switch SW-1 is closed to precondition the various switching circuits.

Starting with the jig at the loading station as shown in FIG. 1, the normally closed portion LS-3A of switch LS-3 will be closed, the lowermost switch LS-7 on the nailing machine will be closed with the head in the up position, and relay RY-3 will be energized to close contacts C-3A and C-3B. With the normally open portion LS-3B of unactuated switch LS-3 being open, there is no circuit to the relay RY-4 and this relay remains unenergized. Also, with the jig at the loading station, the actuator 134 will be in engagement with limit switch LS-1 and hence the normally closed portion LS-1B will be opened to break the circuit to relays RY-10 and RY-11. A circuit is closed through the normally open contact LS-1A, which is now closed, to energize relay RY-8, and a circuit is closed through the normally closed contact C-10B to energize the relay RY-9. Contact C-9A thereby closes to maintain the circuit to the relays RY-8 and RY-9 after the jig moves out of the loading station and opens switch section LS-1A. Relay RY-8 closes the time-delay contact C-8A only after a predetermined period of time. This period of time will be utilized by the workmen positioned alongside the loading table to place the stringers and deck boards into the proper positions upon the jig.

After a time sufficient to load the jig, the time-delay contact C-8A closes and this closes a circuit through the normally closed limit switch LS-2, the normally open safety switch LS-5 which is closed by the nailing head in its up position, and the normally closed contact C-4B to energize relay RY-7. Energization of relay RY-7 closes normally open contact C-7A to provide a circuit to the solenoid SL-1. As shown in the hydraulic circuit of FIG. 12, the solenoid SL-1 shifts the four-way control valve V1 to the right and out of its neutral blocking position to provide a hydraulic circuit to the hydraulic motor M4 and thereby drive the endless conveyors 18 to carry the carriage forwardly towards the nailing machine. As the jig leaves the loading station, portion LS-1A of limit switch LS-1 will open, but relays RY-8 and RY-9 will be maintained in energized conditions through the contact C-9A which had previously been closed and through the normally closed limit switch LS-2.

When the first conveyor switch actuator member 140a arrives at the conveyor switch LS-3, the normally closed portion LS-3a thereof will be opened and the normally open portion LS-3b thereof will be closed. This will permit relay RY-3 to remain energized and will also cause the energization of relay RY-4 through the now closed contact C-3B and the normally closed contact C-11A. Closing of relay RY-4 opens contact C-4B to break the circuit to the relay RY-7, thereby opening contact C-7A and breaking the circuit to the solenoid SL-1 operating the hydraulic motor for the conveyors. Thus, the conveyor will stop in the proper position with the first of the stringers directly under the nailing head.

The operator now pushes a foot switch FS to close a circuit to the relay RY-6. This relay closes the holding contacts C-6A and C-6B and permits operation of the nailing machine. Relay RY-5 which controls the operation of the nailing machine clutch 35 is energized through LS-3B, C-3B, C-11A and C-6A and the motor M1 is drivingly engaged with drive wheel 32 to impart downward movement to the nailing head 26. As the nailing head moves, the uppermost safety switch LS-5 will be deactuated and allowed to open. Downward movement of the nailing head also deactuates middle limit switch LS-6 and allows it to close. When the nailing head gets to the bottom of its stroke and drives the nails, the normally closed limit switch LS-7 will be opened to deenergize the relay RY-3. Relay RY-4 and clutch relay RY-5 will however remain energized through LS-6 and C-4A until the nailing head is returned to its uppermost position to again open switch LS-6. When this occurs, the circuit to relay RY-4 through the switch LS-6 and the contact C-4A will be broken, and the circuit to the clutch relay RY-5 will be broken to deenergize the clutch and stop the movement of the nailing head. With relay RY-4 unenergized, a circuit is now again completed to relay RY-7 through the normally closed limit switch LS-2, the closed contact C-8A, the limit switch LS-5 closed by the nailing head, and the normally closed contact C-4B. Closing of relay RY-7 closes the contact C-7A to energize the solenoid SL-1 and thereby again energize the hydraulic motor driving the conveyor. Consequently, the jig is again carried forwardly until the second conveyor switch actuator 140b engages the conveyor switch LS-3 and the aforedescribed process is repeated.

The sequence involving the alternating actuation of the conveyors 18 and the nailing machine 12 is repeated for each of the switch actuators 140b and 140c after which the jig will clear the nailing machine structure with the pallet having been completely nailed, i.e., each of the three stringers will be nailed to the overlying deck boards. As the carriage continues to move, the cam rollers 112 will strike the inclined face 121 of the cam 120 to drop the pallet to the underlying conveyor 19 in the manner previously described. At this same time, the trailing switch actuator 135 will engage the limit switch LS-2 to break the circuit to the relay RY-7 and open contact C-7A to the solenoid SL-1 to stop the conveyor. As the partially constructed pallet falls upon the underlying conveyor, it will actuate and close the normally open limit switch LS-4 and complete a circuit to relays RY-10 and RY-11 through the normally closed contact C-9B and the normally closed portion LS-1B of the limit switch LS-1. With relays RY-10 and RY-11 closed, the holding contact C-11B closes to maintain the circuit to these relays and the contact C-10A closes to maintain a circuit to relay RY-7. The actuation of relay RY-7 now operates to drive the conveyor in reverse since the contact C-7B will be closed to complete a circuit to the solenoid SL-2. As is evident from the hydraulic diagram of FIG. 12, the solenoid SL-2 pushes the hydraulic control valve V1 to the left to reverse the flow through the hydraulic motor M4 and thereby reverse the direction of movement of the conveyor. The carriage 16 will now be propelled back to the loading station to open the normally closed portion LS-1B of the limit switch LS-1 and open the circuit to relays RY-10 and RY-11 to stop the conveyor. RY-9 and RY-8 are immediately closed in the manner previously described and the loading operation is initiated again. Also as previously described, the jig will start forward after a predetermined period of time during which the loading operation will be accomplished.

A toggle switch SW-2 is provided to maintain a circuit to the relay RY-6 so that the foot switch FS will not have to be tripped at the start of each pallet nailing operation, if so desired. Also, a two-way toggle switch SW-3 is provided so that the conveyor can be moved in either the reverse or forward directions by the operator; it will be noted that SW-3 is only operable when SW-1 is unengaged and the aforedescribed automatic operating circuitry is dead.

It can be seen that the assembly jig of the present invention is readily adaptable for use with conventional industrial nailing machinery since it is comprised of a frame structure which can be run in a straight line path through the nailing machine and can easily be adjusted in height or otherwise modified to meet the demands of a particular nailing operation. Furthermore, the stringer or cross piece supporting members are easily laterally adjustable upon the jig so that differently sized pallets can be nailed without necessitating a long delay. Furthermore, where the stringers are to be placed at different positions, or where a different number of stringers are to be used, one pair of stringer supporting assemblies 60 can be rapidly removed from the apparatus and replaced with a different pair of stringer supporting assemblies that have been preset with the stringer pockets in the correct positions. This quick change feature is possible since such an operation involves no more than the lifting of one set of support rods 64 out of their U-shaped receiving grooves 70,71, and 100, and the placing of the alternate set of support rods therein. Pallets of different deck board lengths are also easily accommodated by the apparatus of the present invention since the back bar 72 is slidably adjustable along the side frame members 42 and 43 with such adjustment being easily and rapidly obtainable.

Another particularly important feature of the present invention is the automatic method of discharge of the nailed structure. No operator is required to remove the nailed pallet from the jig, the jig automatically discharging the pallet and automatically returning to the loading station. Consequently, only the loader, or loaders, who are stationed at the loading end of the apparatus are necessary to successfully operate it.

Although the best mode contemplated for carrying out the present invention has been herein shown and described, it will be apparent that modification and variation may be made without departing from what is regarded to be the subject matter of the invention as set forth in the appended claims.

I claim:

1. An assembly jig and transport means therefor for the nailing of wood frame structures that comprise a plurality of cross pieces arranged in parallel spaced relationship and a plurality of top pieces arranged crosswise to and on top of said cross pieces, said jig comprising a horizontally oriented rigid supporting frame, at least one cross piece supporting member laterally adjustably mounted upon said supporting frame, means for positioning said top pieces upon said supported cross pieces, conveying means attached to said supporting frame for moving said frame from a loading position to a position beneath a nailing machine structure to permit said top pieces and cross pieces to be nailed together and to a discharging position downstream of said machine, and means for shifting the position of said cross piece supporting member relative to said supporting frame to cause the nailed assembly to be dropped vertically out of said jig at said discharging position.

2. An assembly jig and transport means therefor for the nailing of wood frame structures as set forth in claim 1 wherein said cross piece supporting member is pivotally mounted at the upper edge thereof to said supporting frame, said cross piece supporting member being positioned so as to engage a cam to cause the supporting member to pivot in its mounting to release said nailed assembly.

3. An assembly jig and transport means therefor for the nailing of wood frame structures as set forth in claim 2 wherein said cross piece supporting member includes a cylindrical rod extending along its uppermost edge, a backing plate depending from said rod and adapted to engage the ends of said cross pieces, and a supporting surface extending at right angles to said backing plate to support the lowermost surfaces of said cross pieces.

4. An assembly jig and transport means therefor for the nailing of wood frame structures as set forth in claim 3 wherein said cylindrical rod is provided with a cam follower mounted in offset relationship to the longitudinal axis of the rod, said cam being positioned to be engaged by said cam follower to rotate said rod about its said axis during discharge of said nailed assembly.

5. An assembly jig and transport means therefor for the nailing of wood frame structures as set forth in claim 1 including a back bar extending transversely to said cross piece supporting member, and means for slidably adjustably mounting said back bar to said supporting frame, the distance between said back bar and a parallel portion of said supporting frame determining the length of the top pieces in the wood frame structure to be nailed with the outer pair of said cross pieces being positioned parallel to and in engagement with said back bar and said parallel portion of the supporting frame.

6. An assembly jig and transport means therefor for the nailing of wood frame structures as set forth in claim 5 including a plurality of guide pieces adjustably mounted upon said back bar and upon said parallel portion of the supporting frame for contact with and alignment of said top pieces of the wood frame structure.

7. An assembly jig and transport means therefor for the nailing of wood frame structures as set forth in claim 1 including control means for said conveying means operable to stop the movement of said supporting frame as each of said cross pieces are received directly beneath the nailing machine structure and when said nailed assembly is dropped from said jig.

8. An assembly jig and transport means therefor for the nailing of wood frame structures as set forth in claim 7 including a switch located beneath said supporting frame at said discharge position for actuation by said nailed assembly when it is dropped, and control means for reversing said conveying means to carry said supporting frame back to said loading position, said last named control means being actuated by said switch.

9. An assembly jig and transport means therefor for the nailing of wood frame structures that comprise a plurality of cross pieces arranged in parallel spaced relationship and a plurality of top pieces arranged crosswise to and on top of said cross pieces, said jig comprising a horizontally oriented supporting frame, said supporting frame including a first cross frame member and a pair of side frame members rigidly interconnected in parallel spaced relationship by said first cross frame member, a pair of cross piece supporting members laterally adjustably mounted upon said first cross frame member in spaced relationship and extending parallel to said side frame members, conveying means attached to said supporting frame for moving said frame from a loading position to a position beneath a nailing machine structure to permit said top pieces and cross pieces to be nailed together and to a discharging position downstream of said nailing machine, and means on said jig arranged to cooperate with a fixed abutment for shifting each of said cross piece supporting members away from the other supporting member to cause the nailed assembly to be dropped vertically out of said jig at said discharging position.

10. An assembly jig and transport means therefor for the nailing of wood frame structures as set forth in claim 9 wherein said cross piece supporting members each include a cylindrical rod, a backing plate extending downwardly from said rod, a backing plate extending downwardly from said rod and being adapted to engage the ends of said cross pieces, and a supporting surface extending at right angles to said backing plate to supportingly engage said cross pieces; said rods being arranged to engage a fixed cam when the supporting frame reaches said discharging position to cause the rods to rotate about their longitudinal axes to thereby move said support surfaces outwardly and drop said nailed assembly.

11. An assembly jig and transport means therefor for the nailing of wood frame structures as set forth in claim 10 including cam followers mounted upon said rods at the ends thereof for engagement with said cam, said cam followers being mounted in laterally offset relationship to said rods, and a second cross frame member connected between said side frame members for rotatably supporting said rods.

12. An assembly jig and transport means therefor for the nailing of wood frame structures as set forth in claim 9 including a back bar positioned transversely to said cross piece supporting members, means for adjustably mounting said back bar to said side frame members in parallel relationship with said first cross frame member, the outermost pair of cross pieces being arranged to lie adjacent to said back bar and to said first cross frame member with said top pieces extending from said first cross frame member to said back bar, the outer pair of top pieces being arranged for parallel engagement with said cross piece supporting members.

13. An assembly jig and transport means therefor for the nailing of wood frame structures as set forth in claim 12 including a plurality of guide pieces adjustably mounted upon said back bar and upon said first cross frame member for contact with and alignment of the edges of said top pieces of the wood frame structure.

PO-1050
(5/69)

UNITED STATES PATENT OFFICE
CERTIFICATE OF CORRECTION

Patent No. 3,552,624        Dated January 5, 1971

Inventor(s)    EDGAR G. M. DYKEMAN, deceased

It is certified that error appears in the above-identified patent and that said Letters Patent are hereby corrected as shown below:

Column 10, line 21, delete "mailing" and insert -- nailing --
Column 10, line 58, after the first occurance of "rod" delete ", a backing plate extending downwardly from said rod".

Signed and sealed this 2nd day of November 1971.

(SEAL)
Attest:

EDWARD M. FLETCHER, JR.
Attesting Officer

ROBERT GOTTSCHALK
Acting Commissioner of Patents